Figure 1:
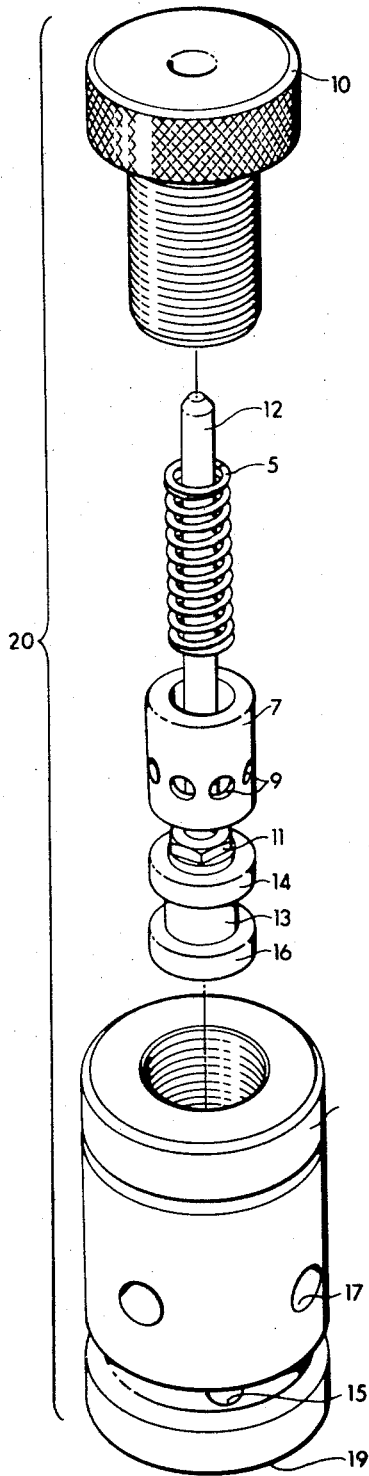

May 17, 1966 C. H. MAYNARD ETAL 3,251,117
BEARING PRE-RUN PROCESS
Filed Oct. 20, 1964 3 Sheets-Sheet 1

INVENTOR.S
CHARLES H. MAYNARD
HERBERT B. SINGER
BY
ATTORNEY

INVENTORS
CHARLES H. MAYNARD
HERBERT B. SINGER
BY
ATTORNEY

United States Patent Office 3,251,117
Patented May 17, 1966

3,251,117
BEARING PRE-RUN PROCESS
Charles H. Maynard, Framingham, and Herbert B. Singer, Mattapan, Mass., assignors to Massachusetts Institute of Technology, Cambridge, Mass., a corporation of Massachusetts
Filed Oct. 20, 1964, Ser. No. 405,129
11 Claims. (Cl. 29—148.4)

This invention relates generally to the manufacture of ball bearings, and particularly concerns a pre-run process for extending the life of ball bearings, especially high performance instrument grade bearings such as spin-axis bearings used in high precision gyros.

As programs for the exploration of space become more ambitious and trajectories penetrate deeper into the environment, the probability of mission success becomes increasingly dependent on the long-term reliability, accuracy, and overall performance of on-board navigation and guidance systems defining the numerous maneuvers required in successfully executing the mission. Of the available types of navigation and guidance systems, inertial systems are unique in that they operate effectively without any external reference information. This feature has obvious advantages in environments such as deep space, where external radiation links are unavailable or unreliable. Almost all inertial navigation and guidance systems employ a stable platform. The platform provides a three-axis reference frame whose orientation remains inertially fixed in space. The platform is suspended in gimbals which provide the necessary isolation and complete rotational freedom from the motion of the vehicle. Precision gyros serve as error-detecting devices in the servo system constraining the orientation of the platform. A space mission may require the gyros controlling the platform comply with pre-set high-performance specifications over a long term. This is because an inertial system is self-contained. Errors developing in the system are cumulative and become increasingly significant as flight time progresses. It is apparent that failure in, or even minute error signals generated by, gyros can cause a costly mission to go astray. It should therefore be of no surprise that coextensive with current efforts to develop improved inertial navigation and guidance systems for deep space missions are programs aimed at providing improved gyros and associative parts that can operate continuously at high-performance levels for as much as 25,000 hours, or nearly three years.

One of the most critical components of gyros are the spin-axis bearings which support the high speed spinning rotor. These bearings must be of extremely high quality and obviously of long life. Substantial test data indicates that extended life, and general high performance is, in part, contingent upon establishing and maintaining a hydro-dynamic condition between bearing balls and races during normal high speed operation. A hydro-dynamic condition is one in which a thin film of lubricant is always present between those bearing components. The film serves as physical isolation and reduces wear. Surface irregularities and asperites on the balls and races, however, tend to penetrate the film. If such penetrations are too frequent, it is theorized that they tend to increase friction and running temperature, eventually destroying the lubricant and the hydro-dynamic film. When this occurs, metal-to-metal contact results and, because of the high rotational speeds, catastrophic failure shortly follows. Consequently, in the manufacture of gyro spin-axis bearings much stress is placed on producing surfaces on bearing components that are sufficiently smooth and free of defects that would otherwise limit life and performance. It is important, of course, that suitably smooth surfaces be produced while maintaining strict control over the geometry of the races and balls.

Manufacturing bearings with surfaces suitable for such long-term service is not an easy task, however. Even when subject to the stringent quality control measures imposed by the manufacturers, a substantial percentage of bearings in the production lot prove unacceptable for gyro applications. One reason for low yield is that many inherent defects are not apparent even when the surfaces are examined through a high-powered microscope. Manufacturers and users thus have devised screening techniques for selecting suitable bearings out of a given production lot. Screening is generically defined in the art as a selecting process whereby bearings are individually chosen by a criterion which reasonably assures that a good percentage will successfully satisfy the intended use. Screening as applied to gyro bearings then is a selecting process giving a reasonable assurance that the selected bearings will meet stringent performance levels and extended operating periods required of inertial systems. Present screening is based on the actual running of bearings under simulated gyro-load and normal speed conditions for a significant test period of up to 800 hours. If the bearings are still operating at required performance levels at the termination of the test and otherwise show no visible defects, compiled statistical data attaches a good probability factor to the expectation that the bearings will continue to perform favorably for a substantial period in the future. From the nature of present screening techniques, it is apparent that they are empirical, very time consuming, and per se appreciably reduce the useful life of the bearings being tested.

In view of the need for improved general purpose ball bearings, and particularly the demand for high-performance long-life instrument grade bearings, applicants have, as a broad concept of their invention, to provide a pre-run process that extends the high performance life of such bearings.

It is an object of the invention to provide a pre-run process for instrument grade bearings with the foregoing feature and that simultaneously improves on current screening methods.

It is another object of the invention to provide a pre-run process that eliminates asperites, surface irregularities, and that otherwise improves the surfaces of the bearing components while maintaining or improving upon their geometry.

It is another object of the invention to provide a pre-run process that makes inherent defects in bearing components evident in a short period of time.

It is yet another object of the invention to provide a standard pre-run process that can be successfully conducted with minimum modifications to the manufacture of ball bearings of various configurations.

It is a specific object of the invention to provide an improved screening process for spin-axis and high speed instrument grade bearings that is of much shorter duration.

It is another specific object of the invention to provide a pre-run process that makes the surfaces of the balls and races conducive to the establishment and maintenance of a hydro-dynamic condition during ordinary high-speed operation.

It is still another specific object of the invention to provide a pre-run process for gyro spin-axis bearings that materially extends the high performance life of incorporating precision gyros.

These and other objects are met by an ethylene glycol (hereafter called gylcol) pre-run process that supplies a smooth finish on the inner and outer races and balls of a pair of ball bearings. In accordance with the invention, a matched pair of ball bearings are mounted in a fixture providing a circulating glycol environment. A preload force is applied to the bearings sufficient to produce a wear track wider than that which would form during normal operation. The bearings are then driven for a relatively short time in the circulating fluid at a speed that is low enough to create rotating metal-to-metal contact between the balls and races. The direction of rotation is periodically reversed so as to generate a non-directional finish in the wear track of the inner and outer races. Bi-directional low speed rotation is continued until there are no measurable defects and irregularities within most of the formed wear track. As the wear track is formed, any minor surface or immediately subsurface irregularities and asperites on the balls and races that would ordinarily pierce a hydrodynamic film are separated and flushed away by the fluid. Consequently, bearing finish is improved. Moreover, because the balls are very closely matched for roundness, any minor deviations in the races and balls are leveled out by the rolling action of the balls and the geometry is also improved. Major inherent defects in the components become obvious upon termination of the process. These will not be remedied by further pre-run, and the entire affected bearing is discarded. By generating a smooth finish in suitable bearings or revealing major inherent defects in unsuitable bearings within a short period, the pre-run process constitutes an effective screening technique and simultaneously produces certain desired physical modifications favorable to longer life and better performance.

Figure 2:
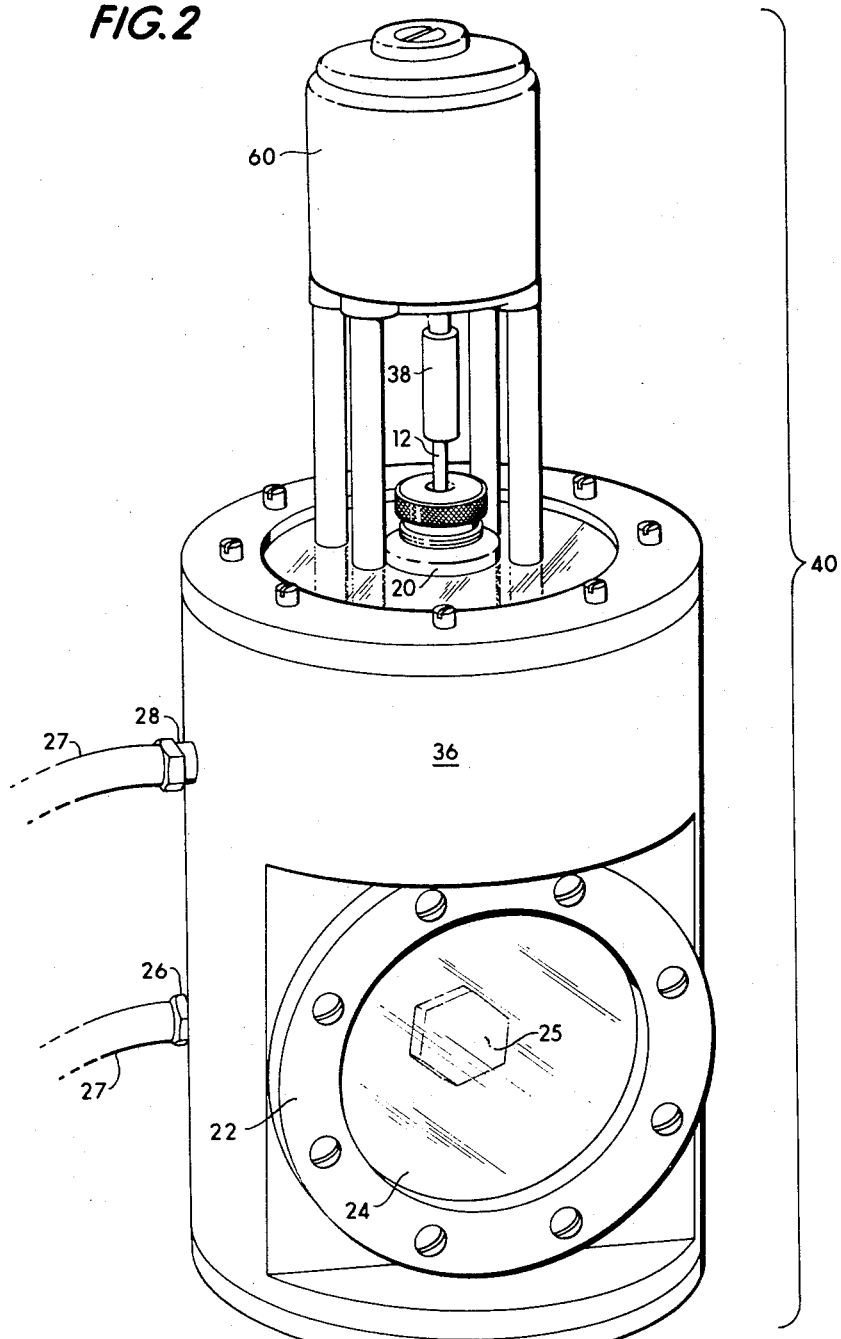
Figure 3:
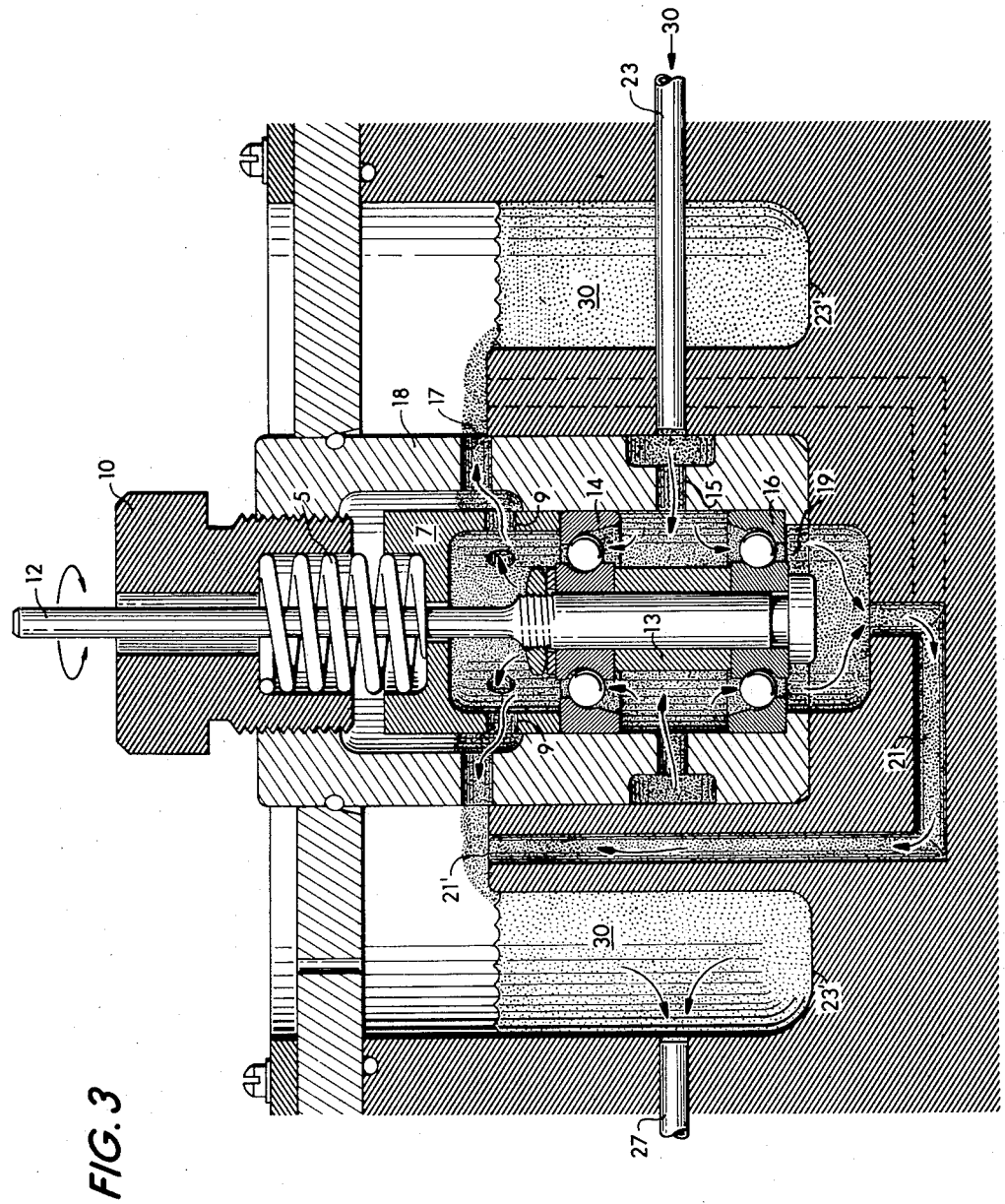

Other objects, features and advantages of the process and a better understanding thereof together with preferred equipment for conducting same will become apparent from the following detailed description taken in conjunction with the accompanying drawings, of which:

FIGURE 1 is an exploded perspective view of the bearing shaft assembly used to accurately position, pre-load and operate the bearings, FIGURE 2 is a perspective view of the preferred fixture used to conduct the process and includes the assembly of FIGURE 1, and FIGURE 3 is a cross-section view of the fixture of FIGURE 2 and illustrates the functional operation thereof.

Shown in FIGURE 1 is a bearing shaft assembly for properly securing a pair of ball bearings inside a fixture used in connection with the present process. The assembly accurately positions the bearings, provides a variable pre-load and provides means for coupling them to an external drive motor. Specifically, the assembly comprises shaft 12 upon which a matched pair of ball bearings 14 and 16 are snugly fitted, a bearing housing 18 having fluid inlet holes 15 and outlet holes 17 and 19 providing a circulatory path of glycol fluid pumped into the housing, and also a pre-load nut 10 for adjusting the axial pre-load force acting between the inner and outer races of the bearings. At the far end of the shaft is a shoulder against which the inner race of bearing 16 is in forced contact. A precision inner race spacer 13 separates the inner races of bearings 14 and 16. Retainer nut 11 is in contact with the inner race of bearing 14, and serves to couple rigidly the two inner races through spacer 13 and press them against the end shoulder of shaft 12. Spring pre-load housing 7 having fluid escape holes 9 and pre-load spring 5 are also mounted on shaft. The hollow pre-load housing is forced against the outer race of bearing 14 when pre-load spring 5 is in compression, and thereby transmits the axial pre-load force from the spring to the outer bearing races through the fixed inner races and balls. Fluid escape holes 9 provide an intermediate exit path for the glycol fluid passing through bearing 14 and headed for outlet holes 17.

Bearing housing 18 has an open bottom 19 and a horizontal internal support shoulder (not shown in FIGURE 1) displaced from the bottom. The open bottom provides an escape path for fluid going through bearing 16. A rigid contact between outer race of bearing 16 and the internal support shoulder together with rigid coupling between the inner races and balls of both bearings allows a torque transmitted to bearing shaft 12 to rotate the inner bearing races relative to the fixed outer races, which are forced up against housing 18. The bearing housing is further designed so that the fluid inlet holes 15 oppose inner races spacer 13 when the bearing shaft is mounted in the housing. This arrangement of inlet and escape holes permits symmetrical circulation of the fluid between and around the balls of both bearings. Upon assembly of the unit, pre-load nut 10 is mated with the threads in housing 18, and rotation of the pre-load nut applies a variable pre-load to the bearings.

After the bearings are assembled as in FIGURE 1, the bearing shaft assembly 20 is installed in the pre-run fixture 40 shown in FIGURE 2. Fixture 40 comprises a housing 36 containing interconnected internal fluid chambers and heating and thermostatic control units (not shown in FIGURE 2), a filter chamber 22 with filter unit 24, and a motor 60 for rotating the bearings. Fluid inlet and outlet terminals, 26 and 28 respectively, are connected to an external pump. Bearing shaft assembly 20 is fitted into the top of housing 36 and arranged so that inlet holes 15 and outlet fluid holes 18 and 19 are in series with the fluid flow channels provided by the housing. At the top of the fixture, shaft 12 of bearing shaft assembly 20 is connected by natural rubber tubing 38 to the shaft of motor 60. The tubing provides simple flexible coupling between the bearings and the motor and compensates for any minor misalignment between the bearing and motor shafts. Motor 60 is one which affords bi-directional torquing of shaft 12 because, as will become apparent, it is preferred that bearings be driven bi-directionally for controlled periods of time.

The functional and structural details of housing 36 are better illustrated in FIGURE 3. Bearing shaft assembly 20 is installed in housing 36 and arranged so that fluid inlet holes 15 oppose inlet fluid channel 23 which carries fluid 30 from filter 24. Fluid passing through either bearing has an outlet, 17 or 21', into sump 23' at the same level. Thus, the fluid approximately divides into two equal flow paths and passes symmetrically through the bearings. Specifically, about half the fluid in channel 23 progresses in the upward direction passing through bearing 14, through escape holes 9 in spring pre-load housing 7, and through outlet hole 17 into sump 23'. On the low end, fluid passing through bearing 16 exists through bottom hole 19 into channel 21 and likewise empties from outlet 21' into sump 23'. The symmetrically flowing fluid passes through and around the balls of each bearing, and when the pump speed is properly adjusted, the fluid has enough velocity to carry away minute metallic particles released from the surfaces of the balls and races during pre-run.

Stainless steel is clean, compatible with glycol fluid and impedes the generation of rust. Consequently, it is used wherever practical in bearing shaft assembly 20. Housing 18, spacer 13, pre-load nut 10, shaft 12, etc., are made of Society of Automotive Engineers (S.A.E.) Standard 303 stainless steel. As fixture housing 36 is large and includes drilled and bored internal passages and compartments, it is more practical from both a weight and cost standpoint to make that housing out of aluminum. American Society of Testing Materials (A.S.T.M.) standard 6061 aluminum bar stock six inches in diameter, for example, provides a suitable material. It is relatively inexpensive and has low copper content.

The bottom of housing 36 is recessed and accomodates the wiring and thermostatic control for heating the fluid. Two 75 watt Chromolox cartridge-type heaters made by E. C. Weigand Company of Pittsburgh, Pennsylvania, occupy recessed three-eights inch diameter holes, one on either side of the filter chamber. They are wired in parallel and connect to a Model 32410-2 miniature thermo-switch control manufactured by Fenwall, Inc. of Ashland, Massachusetts. The thermo-switch is screw-mounted in the bottom recess just below the filter chamber between the two heater cartridges where it can best sense fluid temperature.

In order to provide maximum heat transmission, the recessed surfaces for these electrical components including heater element holes are not nickel-plated. With this exception, electrodeless nickel plating and polishing of housing surfaces including internal channels reduces wear, resists chemical action, and makes the fixture easier to clean. A stainless steel bottom cover plate covers the entire bottom electrical compartment and seals it from the fluid. The use of a Teflon (polytetrafluoro-ethylene) O-ring seal is practical in the sense that the fixture may be cleaned and completely submerged in cleaning solvent without affecting the electrical components.

Filter cartridge 22 is a standard half-inch TSMX-H manufactured by the Pall Corporation of Courtland, New York. It consists of five sintered stainless steel three-inch diameter elements mounted on a hollow sleeve and was modified to accommodate a one-quarter-inch pipe thread at one end and a closed retainer nut 25 at the other end. Filter chamber 22 is covered and sealed with a Teflon O-ring and a glass cover plate with eight stainless steel hold-down screws. Also note in FIGURE 2 that the fluid inlet and outlet terminals are not vertically aligned. Inlet terminal 26 is slightly off-centered to avoid running into the heater elements, one of which is installed vertically in a three-eighths-inch hole on each side of filter chamber 24.

As cleanliness and the elimination of impurities is important to the process, the glycol circulating pump and tubing 27 connecting the pump to fixture 40 is also made of non-corrosive material. A palpitating type pump made by the Randolph Company of Houston, Texas (Model 500) is suitable. Using a six-inch pump pulley and a one and one-half inch motor pulley, the normal pump speed is variable between 200 to 400 r.p.m. Natural rubber or silicone rubber are satisfactory tubing material for use with glycol. For example, tubing made of "Silatube" (S 2000) and manufactured by Ronthor Reise Corporation, Little Falls, New Jersey is good.

The fluid used in connection with the present process is commercial-grade clear ethylene glycol

$$(HOCH_2CH_2OH)$$

at full strength and at room temperature. The viscosity of this fluid at room temperature (70° F.) is approximately 20 cps. The actual pump speed was set at about 400 r.p.m. and this was sufficient to produce flow without creating excessive pressure drops across bearings. Although the emphasis is on developing enough velocity in the fluid to carry away any minute metallic particles released during the process, pressure drops across bearings having the below specifications should not exceed three to five pounds. To insure against the development of an excessive pressure drop across bearing of any class, a pressure gage may be temporarily inserted into the line between the pump and the fixture 40 so as to help determine the proper pump motor control setting. However, to avoid contamination of the fluid the gage should not be left permanently in the line.

While it is possible to employ the process in the manufacture of a number of kinds of bearings, the principle was thoroughly confirmed for a class of gyro spin-axis bearings having the specifications listed below and thus now will be described in detail in that connection.

Bearing specifications (1) Size and type: $R_4H$
(2) Contact angle: 25°
(3) Ball number and size: 9—3/32 (.09375)"
(4) Bearing material: S.A.E. Standard 52100 Tool Steel—Single vacuum melted
(5) Heat Treatment: $R_C$ 59–62, as stress relieved
(6) Normal Operating Speed: 12,000–24,000 r.p.m. (outer race rotating)

Preliminaries

Before being installed in the bearing housing assembly, bearings of a production lot are inspected to insure they conform with high quality control standards generally set for spin-axis bearings. For example, races are checked for roundness and cross-curvature and those falling outside acceptable tolerances at any point in the race are rejected. Similarly, balls are inspected for roundness and size and on that basis matched for installation in an individual bearing. Matched balls are those having roundness and diameter size within pre-set tolerances. Ball roundness and size are derived by measuring ball diameter at five different points on the ball. Maximum deviation in these measurements is roundness. The average is defined as size. Screening of spin-axis bearings also includes observation of surface under a 100× microscope. Evidence of deep scratches, severe inclusions, rust or corrosion, and deep brinnel marks are further grounds for rejection. The contact angle between balls and races are also measured and the two bearings installed in the bearing shaft assembly are further matched according to O.D., I.D., and widths, all of which do not exceed pre-set tolerances.

The selected components for bearing pairs are next demagnetized to eliminate residual magnetism and then cleaned. One possible cleaning process is as follows:

First, the races and balls are ultrasonically cleaned for five minutes in reagent grade toluene. Races and balls are then brushed over a vacuum hose, preferably the brush is of camel hair and soaked with toluene. Thereafter, components are ultrasonically cleaned for five minutes in trichloro-trifluoroethane (Freon 113) and reagent grade methanol, successively. They are then dipped into a solution of 50% acetone and 50% methanol. After each of the aforementioned soaking steps, the components are vacuum dried. Balls and races are now inspected through a 40× microscope and any film and contamination not removed by the solvents is manually removed with a camel-hair brush soaked in a solution of 50% acetone and 50% methanol over a vacuum hose, or with soft metal tweezers. Fixture components (housing, shaft, spacer, nut, spring, etc.) are also cleaned in the same way.

After cleaning, the bearings are assembled and a solid Derlin inner race riding retainer incorporated to separate the balls. The ouside diameter of the retainer is designed to allow sufficient clearance with the outer race and this permits the free passage of fluid during pre-run. The nine ball pockets are in the order of .004 to .010 inch loose.

Before the bearings are installed within the fixture, the pump is activated to circulate the glycol fluid. Circulation continues for at least thirty minutes during which contamination is filtered from the fluid. If the fixture is not in an air-conditioned room, measures must be taken to prevent contamination of the fixture and the fluid. Also, since glycol is extremely hygroscopic, care must be taken to keep reserve fluid supply tightly bottled and the fixture fluid should be changed frequently if exposed to excessive humidity.

Process

The pump is turned off and the bearing housing is slowly installed in the pre-run fixture, care being exercised to align properly the inlet and outlet holes of the assembly with corresponding channels in the housing 36. Care is also exercised not to rotate the bearing shaft, as the bearings are clean and unlubricated and severe damage can thus occur by rolling the balls between the races. The pump is again started and fluid allowed to circulate for thirty more minutes to remove contaminants introduced during installation of the bearings. Thereafter, assuming that a thirty r.p.m. constant-speed bearing drive motor is used, the bearings are rotated in the flowing glycol environment with a pre-load substantially below the maximum design pre-load in a first direction for a first interval of approximately fifteen minutes. At the end of this first interval, the pre-load is increased by one pound and the motor activated to rotate the bearings in an opposite direction for an approximate period of fifteen minutes. This procedure of rotating the bearings in one direction for a fifteen minute interval and then stopping the process to increase the compressive load by one pound, and subsequently rotating the bearings in an opposite direction is continued for fifteen minute intervals until a maximum compressive load of approximately twice the normal operating pre-load is achieved. Thereafter, the sequential reversal of bearing drive after fifteen minute intervals of operation continues at a maximum pre-loading until a suitably smooth finish, as will now be described, has been achieved on the surfaces of the races and balls.

*Wear track and pre-run time*

Because the bearings are driven in both directions for like intervals of time, the smooth wear track resulting from the metal-to-metal contact between balls and races has a non-directional finish. The track is wider than that created during normal operation because of the increased pre-load. A wider wear track is a desirable feature as it insures that the balls will roll in the smooth area when they are eventually used in an instrument. The necessary quality of smoothness will depend on the intended use of the bearings. Generally stated, a suitably smooth wear track is one displaying no minor scratches, asperites or other defects tending to destroy a hydro-dynamic condition or to reduce general performance below acceptable levels during the intended life of the bearing. Because of the imposed stringent performance requirements, it is recognized that the wear track in gyro spin-axis bearings must be of higher quality than in other types of instrument-grade bearings. A sufficiently smooth wear track for spin-axis bearings is one that shows very few if any of the original lap marks and above mentioned minor defects when viewed under a 200 power microscope. Track smoothness in bearings designed to meet less stringent performance requirements, such as other types of instrument-grade bearings or general purpose bearings, need not qualify to this resolution. Satisfactory viewing through a 100 power microscope, for example, should be sufficient, though many bearings qualifying at 100 power, it turns out, will also qualify at 200 power. This is because microscopic power in that order of magnitude is not too critical as extraneous factors such as lighting and the optical relation between the microscope, the holding fixture and the race contribute to what will be seen on the track.

The necessary pre-run time for bearings of different production lots will vary according to differences in the history and composition of the bearing, for example, differences in tempering temperatures, metal purity, geometry, etc. These differences make it impossible to set a precise time period for any one bearing type. Consequently, some pre-running and subsequent visual evaluation is necessary to define the optimum time parameter for bearings for each production lot. With respect to a lot containing a large number of bearings, the manufacturer will find much less variation from bearing to bearing in the time required to obtain optimum surface conditions. He will thus be able to take the average time and use it in processing the remainder of the production lot. For gyro spin-axis bearings having the above mentioned specifications the duration of pre-run varied from five to ten hours. The chordal width of the final track was between .013 and .018 inch as viewed through a microscope, using a calibrated stage micrometer eyepiece or through an interference microscope.

While a preferred process has been described in connection with gyro spin-axis bearings, other types of instrument grade bearings as well as general purpose bearings may be manufactured thereby. Moreover, slight departures from that process may be made and yet remain within the intended scope of the invention. For example, in generating the wide wear-track, the pre-load force was described as being gradually built up to approximately twice the normal pre-load. A gradual increase in force is not necessary and the maximum pre-load may be applied all at once at the start of the process. The maximum load need not be essentially equal to twice the design pre-load. This figure is merely cited as a convenient guide for processing the spin-axis bearings described. Emphasized is the development of a wider track and this may be achieved by applying a greater-than-normal force in steps or all at once. However, it is important that the load not exceed acceptable limits, in other words, be insufficient to overstress or damage the bearings. Also, the direction of rotation need not be reversed every fifteen minutes as mentioned. Stressed is the development of a non-directional finish in the wear track and this may be had by using other periods of operation. Finally, equipment other than that shown may be employed in conducting the process and other methods for cleaning the bearings may be equally acceptable. To cover these and other modifications falling within the true spirit of the pre-run process, the invention is now defined in the appended claims.

What is claimed is:

1. A process for pre-running a ball bearing with inner and outer races and balls in a fixture providing a flowing ethylene glycol environment and affording means for pre-loading said bearing, comprising the steps of:
    (a) symmetrically circulating glycol through said bearing with sufficient velocity to flush away minute metallic particles released during said process,
    (b) applying a pre-load to said bearing greater than the normal specified pre-load,
    (c) driving said bearings at a low speed in both rotational directions to produce a non-directional finish in the wear track of each race, and
    (d) continuing to drive said bearings in both rotational directions until there are essentially no surface defects within said wear tracks that would interfere with the development and maintenance of a hydro-dynamic condition.

2. A process for pre-running a ball bearing with inner and outer races and balls in a fixture providing a flowing ethylene glycol environment and affording means for pre-loading said bearing, comprising the steps of:
    (a) symmetrically circulating glycol through said bearing with sufficient velocity to flush away minute metallic particles released during said process,
    (b) applying a pre-load to said bearing greater than the normal specified pre-load,
    (c) rotating said bearing in said circulating glycol at a speed allowing metal-to-metal contact between said balls and races,
    (d) periodically reversing the direction of rotation of said bearing so as to form a non-directional wear track in each race, and continuing said periodic reversals in rotational direction until there are essentially no surface defects in said wear track apparent when viewed through a 100 power microscope.

3. A process for pre-running ball bearings as defined in claim 2, however where the rotating speed is between 20 and 40 r.p.m.

4. A process for pre-running ball bearings containing inner and outer races and balls, in a fixture providing a flowing ethylene glycol environment and affording means for pre-loading said bearings, comprising the steps of:
    (a) circulating glycol through said bearings with sufficient velocity to flush away minute metallic particles released during said process,
    (b) applying a pre-load to said bearings substantially equal to the pre-load normally specified for said bearings, (c) rotating said bearings in said flowing glycol in a first direction for a time period "*t*,"

(d) at the end of period "*t*" increasing said pre-load by an increment and rotating said bearings in a second direction for a period of substantially "*t*," thereafter (e) increasing the pre-load on said bearing by an increment and rotating said bearing again in said first direction for a period of substantially "*t*,"

(f) at the end of step (e) and each succeeding running period of substantially "*t*," reversing the direction of rotation and increasing said pre-load by an increment, and continuing to increase said pre-load accordingly until a maximum safe pre-load appreciably greater than the designed pre-load is achieved, and (g) continuing the sequential reversal of rotation for running periods of substantially "*t*" at said maximum pre-load until a smooth finish develops in the wear track of each race that has few apparent surface defects when viewed through a 100 power microscope.

5. A process for pre-running ball bearings as defined in claim 4 where the rotating speed is between 20 and 40 r.p.m.

6. A process for pre-running gyro spin-axis ball bearings as defined in claim 4 wherein said maximum pre-load is approximately equal to twice the normal pre-load specified for said bearings.

7. A process for pre-running ball bearings as defined in claim 6 where the rotating speed is between 20 and 40 r.p.m.

8. A process for pre-running gyro spin-axis ball bearings of the kind described, in a fixture providing a flowing glycol environment and affording means for pre-loading said bearing, comprising the steps of:

(a) circulating glycol through said bearings with sufficient flow to carry away minute metallic particles released during said process, (b) applying a maximum pre-load greater than the normal pre-load specified for said bearings, (c) rotating said bearings at said maximum pre-load in a first direction for approximately fifteen minutes, thereafter (d) rotating said pre-loaded bearings for essentially fifteen minutes in a second direction, thereafter (e) continuing the sequential reversal of rotation of said pre-loaded bearings at fifteen minute intervals until the total running period is between five and ten hours.

9. A process for pre-running ball bearings as defined in claim 8 where the rotating speed is between 20 and 40 r.p.m.

10. A process for pre-running gyro spin-axis ball bearings of the kind described, in a fixture providing flowing ethylene glycol environment and affording means for pre-loading said bearings, comprising the steps of:

(a) circulating glycol through said bearings with sufficient flow to carry away minute metallic particles released during said process, (b) applying a pre-load essentially equal to the pre-load normally specified for said bearings, (c) rotating the pre-loaded bearing in said circulating glycol in a first direction for approximately fifteen minutes, thereafter, (d) increasing said pre-load by one pound and rotating said ball for a period of fifteen minutes in a second direction, (e) at the end of step (d), and each succeeding fifteen minute interval reversing the direction of rotation and increasing the pre-load by an increment of one pound, and continuing to increase said pre-load accordingly until a maximum pre-load of approximately twice the design pre-load is achieved, and (f) continuing the sequential reversal of rotation at fifteen minute intervals at said maximum pre-load until the total running period is between five and ten hours.

11. A process for pre-running ball bearings as defined in claim 10 where the rotating speed is between 20 and 40 r.p.m.

References Cited by the Examiner
UNITED STATES PATENTS

| | | | |
|---|---|---|---|
| 1,967,770 | 7/1934 | Ford | 29—89.5 X |
| 2,719,765 | 10/1955 | Menne | 29—148.4 |
| 2,783,528 | 3/1957 | Menne | 29—148.4 |
| 2,821,016 | 1/1958 | Dickson | 29—424 |
| 3,109,223 | 11/1963 | McCloskey | 29—148.4 |

WHITMORE A. WILTZ, *Primary Examiner.*

THOMAS H. EAGER, *Examiner.*